United States Patent
Zhang et al.

(10) Patent No.: US 9,482,167 B2
(45) Date of Patent: Nov. 1, 2016

(54) HYBRID PUMP CONTROL FOR MULTI FUEL ENGINE SYSTEM

(71) Applicant: Caterpillar Paving Products Inc., Brooklyn Park, MN (US)

(72) Inventors: Yanchai Zhang, Dunlap, IL (US); Mallikharjuna R. Boddu, Peoria, IL (US); Evan E. Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 14/175,739

(22) Filed: Feb. 7, 2014

(65) Prior Publication Data

US 2015/0226140 A1    Aug. 13, 2015

(51) Int. Cl.

| | | |
|---|---|---|
| *F02M 1/00* | (2006.01) | |
| *F02D 41/00* | (2006.01) | |
| *F02D 41/04* | (2006.01) | |
| *F02M 21/02* | (2006.01) | |
| *H02J 7/34* | (2006.01) | |
| *F02D 19/06* | (2006.01) | |
| *F02D 19/10* | (2006.01) | |

(52) U.S. Cl.
CPC ....... *F02D 41/0027* (2013.01); *F02D 19/0684* (2013.01); *F02D 19/105* (2013.01); *F02D 41/04* (2013.01); *F02M 21/0224* (2013.01); *F02M 21/0245* (2013.01); *H02J 7/34* (2013.01); *F02D 41/0025* (2013.01); *Y02T 10/32* (2013.01); *Y02T 10/36* (2013.01)

(58) Field of Classification Search
CPC ..... F02D 19/06; B60W 10/06; B60W 10/10; F02M 55/025; F02M 63/0225; F02M 37/0029
USPC .......................... 123/456, 457, 463
See application file for complete search history.

(56) References Cited

U.S. PATENT DOCUMENTS

| | | | |
|---|---|---|---|
| 7,231,998 B1 * | 6/2007 | Schechter | B60K 6/12 180/165 |
| 7,949,452 B2 | 5/2011 | Eriksson et al. | |
| 8,006,677 B2 | 8/2011 | Williams et al. | |
| 8,099,220 B2 | 1/2012 | Kim et al. | |
| 2011/0264358 A1 | 10/2011 | Nishida | |
| 2011/0301794 A1 | 12/2011 | Bastien | |
| 2013/0158752 A1 | 6/2013 | Norton | |
| 2013/0230376 A1 | 9/2013 | Soma' et al. | |
| 2015/0233310 A1 * | 8/2015 | Zhang | F02D 19/06 701/54 |
| 2015/0275108 A1 * | 10/2015 | Gueh | C10J 3/57 252/373 |

* cited by examiner

*Primary Examiner* — John Kwon
(74) *Attorney, Agent, or Firm* — Miller, Matthias & Hull LLP

(57) ABSTRACT

In an engine system of a machine having a multi fuel engine system, an energy accumulator is provide to accumulate and store energy when the engine system is in a low engine power usage or low engine load state, and to discharge energy from the energy accumulator when the engine system is in a high engine usage or high engine load state. The energy accumulator may be implemented, for example, in the form of a gaseous fuel accumulator that delivers gaseous fuel to the engine, a hydraulic fuel accumulator that provides pressurized fluid to power a fuel pump, or a battery pack that powers an electric hydraulic pump.

20 Claims, 6 Drawing Sheets

HYBRID PUMP CONTROL FOR MULTI FUEL ENGINE SYSTEM

TECHNICAL FIELD

The present disclosure relates generally to multi fuel engines capable of operating with liquid fuel, with gaseous fuel and with a mixture of liquid and gaseous fuels, and more particularly, to methods and systems for controlling cryogenic, hydraulic and pneumatic pumps in multi fuel engines to efficiently store hydraulic, electrical and/or mechanical power for providing power assist during heavy engine loading.

BACKGROUND

A multi fuel engine refers generically to any type of engine, boiler, heater or other fuel-burning device which is designed to burn multiple types of fuels in its operation. Multi fuel engines have application in diverse areas to meet particular operational needs in the operating environment. For example, a common use of multi fuel engines is in military vehicles so that vehicles in various deployment locations may run a wide range of alternative fuels such as gasoline, diesel or aviation fuel. In combat settings, for example, enemy action or unit isolation may limit the available fuel supply and personnel may need to resort the type of fuel available for usage from enemy and civilian sources. Multi fuel engines are also desirable where cheaper fuel sources, such as natural gas, are available, but an alternative or secondary fuel, such as diesel fuel, is needed for performance reasons (e.g., faster reaction to short term load demand), as a backup in the event of an interruption in the supply of the primary fuel source, or for other operational or engine performance conditions.

A multi fuel engine typically operates with a specified mixture of the available fuels. Where a liquid-only fuel mixture is specified, a liquid fuel, such as diesel fuel, gasoline or other liquid hydrocarbon fuel, is injected directly into an engine cylinder or a pre-combustion chamber as the sole source of energy during combustion. When a liquid and gaseous fuel mixture is specified, a gaseous fuel, such as natural gas, methane, hexane, pentane or any other appropriate gaseous hydrocarbon fuel, may be mixed with air in an intake port of a cylinder and a small amount or pilot amount of liquid fuel, such as diesel fuel, is injected into the cylinder or the pre-combustion chamber in an amount according to a specified substitution ratio in order to ignite the mixture of air and gaseous fuel.

In one exemplary multi fuel engine, when the gaseous fuel is required for the combustion cycle, liquid natural gas (LNG) is pumped by a cryogenic pump from a LNG tank through a vaporizer and into an accumulator as compressed natural gas (CNG). The accumulator typically is minimally sized to take the volume of one full stroke of the cryogenic pump. The cryogenic pump is powered by pressurized oil provided by a hydraulic pump that may be powered by an operative connection to an output shaft of the multi fuel engine or by a battery pack that is selectively operatively coupled to the output shaft for recharging. When connected to the engine, the mechanical hydraulic pump or the battery pack draw power from the engine that otherwise would propel the machine, and the hydraulic pump and the cryogenic pump must work continuously to provide CNG to the engine. The power draw for the hydraulic pump requires more power to be generated by the engine and, correspondingly, the use of more fuel by the engine, to propel the machine at the commanded speed. Where the hydraulic pump is electric and powered by the battery pack, the hydraulic pump may run off the battery pack for a time, but eventually the batteries must be recharged by the engine, and possibly while the engine is propelling the machine, and thereby resulting in similar inefficient operation of the machine. In view of this, a need exists for improved systems and controls for operating the hydraulic and/or cryogenic pumps to provide gaseous fuel to the multi fuel engine and, where natural gas is used as the gaseous fuel, converting LNG to CNG and providing the CNG to the engine for the combustion cycle in a manner that improves the efficiency of the machine system.

SUMMARY OF THE DISCLOSURE

In one aspect of the present disclosure, an engine system for a machine is disclosed. The engine system may include an engine, a fuel supply system and energy accumulator and an electronic control module operatively connected to the engine, the fuel supply system and the energy accumulator. The fuel supply system may include a fuel reservoir in fluid communication with the engine, and a pump operatively connected to the fuel reservoir to produce flow of fuel from the fuel reservoir to the engine. The energy accumulator may be operatively connected to the fuel supply system, and the energy accumulator may have capacity to store energy and be configured to discharge the energy to produce a fuel flow in the fuel supply system. The electronic control module may be configured to determine whether the energy accumulator is charged with a charged energy amount that is greater than a recharge limit amount, to determine a machine operational state for the machine in response to determining that the charged energy amount is less than the recharge limit amount, and to execute an energy accumulator charging operation to increase the charged energy amount in the energy accumulator in response to determining that the machine operational state is equal to an energy accumulator charging state.

In another aspect of the present disclosure, a method for controlling energy storage for a multi fuel engine of an engine system of a machine is disclosed. The method for controlling energy storage may include determining whether an energy accumulator of the engine system is charged with a charged energy amount that is greater than a recharge limit amount, determining a machine operational state for the machine in response to determining that the charged energy amount is less than the recharge limit amount, and executing an energy accumulator charging operation in response to determining that the machine operational state is equal to an energy accumulator charging state.

Additional aspects are defined by the claims of this patent.

DETAILED DESCRIPTION

Although the following text sets forth a detailed description of numerous different embodiments of the present disclosure, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning Finally, unless a claim element is defined by reciting the word "means" and a function without the recital of any structure, it is not intended that the scope of any claim element be interpreted based on the application of 35 U.S.C. §112(f).

Figure 1:
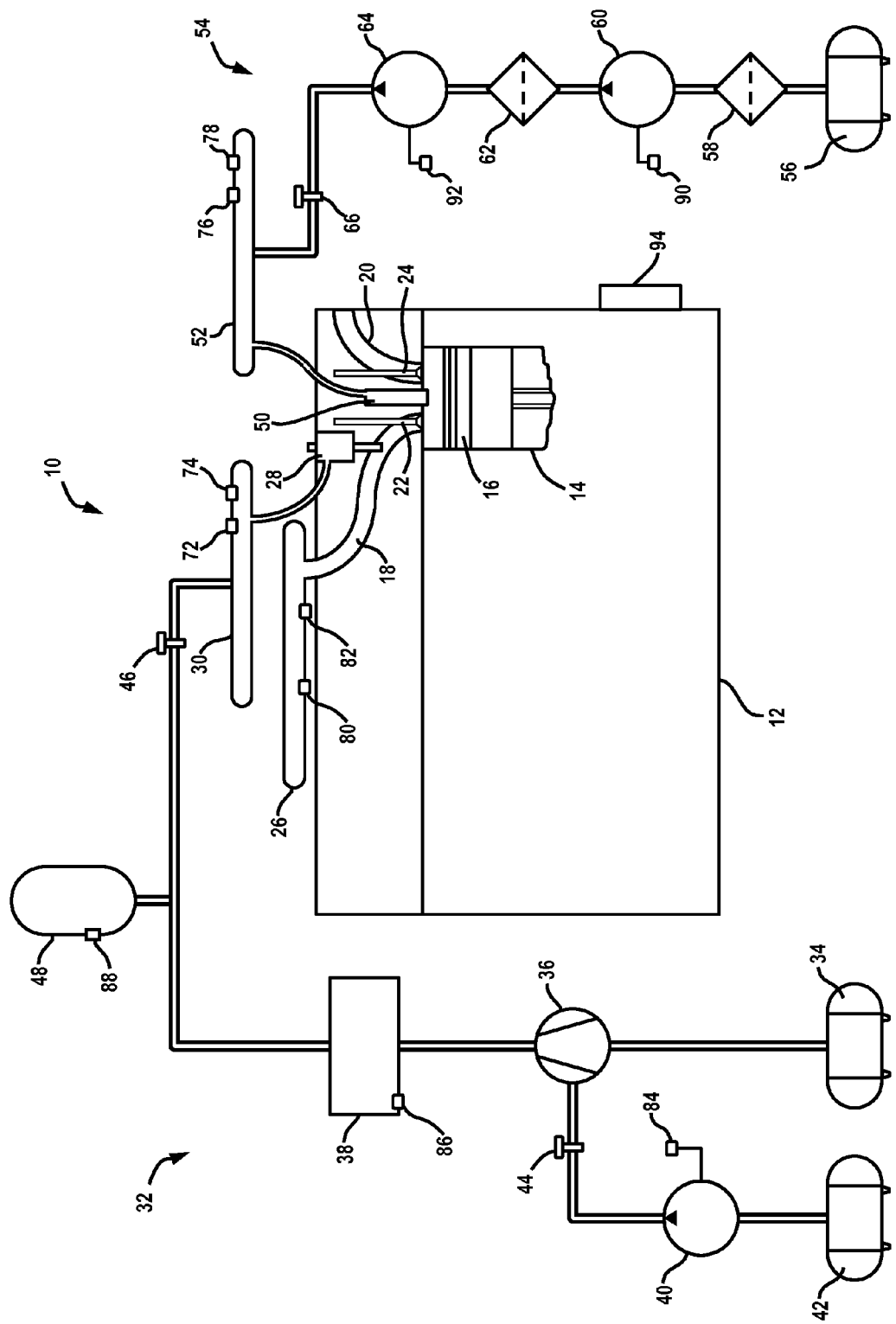
FIG. 1 is a schematic view of an exemplary multi fuel engine system in accordance with the present disclosure.

Referring to the drawings, FIG. 1 depicts an exemplary multi fuel engine system 10 that may include an engine 12 with a representative cylinder 14 of a plurality of cylinders 14 implemented in the engine 12. Although only one cylinder 14 is shown, it is recognized that the actual number of cylinders 14 of the engine 12 could vary and that the engine 12 could be of the in-line type, V-type, or even a rotary type engine. A piston 16 is positioned for displacement within the cylinder 14, and the cylinder 14 includes an intake port 18, an exhaust port 20, and an intake valve 22 and exhaust valve 24 regulating the fluid communication between the cylinder 14 and the intake port 18 and the exhaust port 20, respectively. The intake port 18 receives air from an air intake manifold 26 to which intake air travels after passing through, for example, an air filter (not shown) and turbo charger (not shown). A gaseous fuel admission valve 28 of a type commonly known in the art is positioned between a gaseous fuel common rail 30 at an upstream side and the intake port 18 at a downstream side. A nozzle portion of the admission valve 28 may extend into the intake port 18 for delivering gaseous fuel thereto and mixing with the air from the air intake manifold 26.

The gaseous fuel common rail 30 may receive gaseous fuel from a gaseous fuel supply system 32. The gaseous fuel supply system 32 may provide any appropriate gaseous fuel that may be used in the multi fuel engine 12, such as LNG, methane, hexane, pentane or any other gaseous hydrocarbon fuel. The supply system 32 may include a gaseous fuel reservoir 34 that may contain the appropriate gaseous fuel, such as natural gas or other gaseous hydrocarbon fuel, that may be in liquid (e.g., LNG) or vapor (e.g., natural gas from a low-pressure gas source) form. An outlet port of the gaseous fuel reservoir 34 may be fluidly connected to a gaseous fuel pump 36 that draws the gaseous fuel in liquid or vapor form from the reservoir 34 and pumps the gaseous fuel across a vaporizer 38 where heat is added to convert the gaseous fuel to a vapor, such as CNG. The vaporizer 38 may be omitted where the gaseous fuel in the gaseous fuel reservoir 34 is already in vapor form.

In the illustrated embodiment, the gaseous fuel pump 36 may be a cryogenic pump that is driven by pressurized hydraulic fluid. The hydraulic fluid is provided by a hydraulic pump 40 that draws hydraulic fluid, such as pump oil, from a hydraulic fluid reservoir 42, and outputs the pressurized hydraulic fluid through a solenoid operated hydraulic fluid cut off valve 44 to the gaseous fuel pump 36. The hydraulic pump 40 may be a mechanical pump directly driven by of the engine 12 by selectively operatively coupling the hydraulic pump 40 to an output shaft of the engine 12 (not shown) via a clutch and belt (not shown) or other selective coupling mechanism. Alternatively, the hydraulic pump 40 may be an electric pump powered by batteries or a battery pack as discussed below that may be recharged via selective operative coupling to the output shaft of the engine 12 when necessary. In other implementations, variable displacement pumps may be substituted and be constantly interconnected, but with the capability to be set to zero displacement to stop flow. Still further, a bypass may be provided, with the hydraulic pump running constantly and fluid being circulated back to the hydraulic fluid reservoir 42 with only a minimum pressure rise when not needed for the gaseous fuel pump 36. Additional alternative pumps and pump arrangements for delivering the gaseous fuel from the gaseous fuel reservoir 34 to the gaseous fuel common rail 30 may be implemented, and are contemplated by the inventors as having use in engine systems 10 in accordance with the present invention.

The vaporized fuel exiting the vaporizer 38 is communicated to the gaseous fuel common rail 30 and ultimately to the admission valves 28 of the cylinders 14. Flow of the vaporized fuel may be controlled by a solenoid operated gas shut off valve 46 that may be shut off when the engine 12 is in a liquid fuel only mode, and open when the engine is in a gaseous fuel only or a mixed fuel mode. The gaseous fuel supply system 32 may further include a CNG accumulator 48 positioned between the gaseous fuel common rail 30 and the vaporizer 38 upstream from the gas shut off valve 46 for storage of CNG that is not yet delivered to the gaseous fuel common rail 30. The size and functioning of the CNG accumulator 48 is discussed in greater detail below. Although not shown, it is recognized that the gaseous fuel supply system 32 might typically include a balance regulator positioned between the gas shut off valve 46 and the gaseous fuel common rail 30 for regulating the gaseous fuel pressure at the upstream side of the gaseous fuel admission valve 28.

The engine 12 may further include a liquid fuel injector 50, such as an electronic unit injector, for injecting liquid fuel, such as diesel fuel, into the cylinder 14. The liquid fuel may be provided to the fuel injector 50 via a liquid fuel common rail 52 supplying each of the cylinders 14 of the engine 12 with pressurized liquid fuel transmitted to the common rail 52 from a liquid fuel supply system 54. Liquid fuel from a liquid fuel reservoir 56 may flow through a primary fuel filter 58 to a liquid fuel transfer pump 60. The transfer pump 60 receives the liquid fuel and then discharges the liquid fuel through a secondary fuel filter 62 to a high pressure (HP) fuel pump 64. The pressurized fuel from the HP fuel pump 64 is transmitted to the liquid fuel common rail 52. A solenoid operated liquid fuel shut off valve 66 may be positioned between HP fuel pump 64 and the liquid fuel common rail 52 to cut off the flow of liquid fuel if necessary. The exhaust port 20 fluidly connects the cylinder 14 to an emissions portion (not shown) of the multi fuel engine system 10 to discharge the exhaust created by the combustion of the fuels from the cylinder 14.

An electronic control module (ECM) 70 (FIG. 2) of the multi fuel engine system 10 may be connected to the various sensors and operating components of the system 10 to monitor and control the performance of the engine 12 and the fuel supply systems 32, 54. In the present system 10, the ECM 70 may be operatively connected to a temperature sensor 72 and a pressure sensor 74 for the gaseous fuel common rail 30, a temperature sensor 76 and a pressure sensor 78 of the liquid fuel common rail 52, a temperature sensor 80 and a pressure sensor 82 of the air intake manifold 26, a hydraulic pump pressure sensor 84, temperature sensors 86, 88 of the vaporizer 38 and the accumulator 48, respectively, pressure sensors 90, 92 of the fuel transfer pump 60 and the HP fuel pump 64, respectively, among other sensing devices. The various sensors are operatively connected to the ECM 70 and transmit control signals to the ECM 70 containing values indicative of the state of the parameters being measured. Such temperature and pressure sensors are well known in the art and therefore a detailed description of the sensors is not included herein. An engine speed sensor 94 associated with a camshaft or other component of the engine 12 from which the engine speed and torque or load on the engine 12 may be determined may also be operatively connected to the ECM 70 for delivering engine speed indicative signals thereto. The ECM 70 may also be operatively connected to the operational and controllable elements of the system 10, including the valves 28, 44, 46, 66, the fuel injector 50, and the pumps 40, 60, 64. In this regard, it is known to include driver circuitry or software within the ECM 70 for delivering control signals to the controlled elements to control the flow rates of the corresponding fuels there through and the delivery of the fuels to the cylinders 14. However, it is recognized that such driver circuitry could be implemented separate from, but connected to, the ECM 70.

The multi fuel engine system 10 as shown can operate in a liquid fuel mode or a multi fuel mode. In the liquid fuel mode, the gaseous fuel admission valve 28 remains closed while pressurized liquid fuel from the liquid fuel supply system 54 is injected into the engine cylinder 14 by the fuel injector 50 as the sole source of fuel energy during combustion. In the multi fuel mode, the gaseous fuel from the gaseous fuel supply system 32 is discharged into the intake port 18 by the gaseous fuel admission valve 28 and mixed with air from air intake manifold 26, and a small amount or pilot amount of the pressurized liquid fuel is injected into cylinder 14 at the fuel injector 50 in order to ignite the mixture of air and gaseous fuel. Those skilled in the art will understand that the configuration of the multi fuel engine system 10 shown in FIG. 1 and described herein is exemplary only, and other configurations are contemplated for implementation of the multi fuel engine control strategy in accordance with the present disclosure. For example, the multi fuel engine system 10 may be configured to be powered by additional types of gaseous and liquid fuels, and the multi fuel engine control strategy may be configured to allow specification of substitution ratios for apportioning the input power required by the engine 12 between the available fuels.

Figure 2:
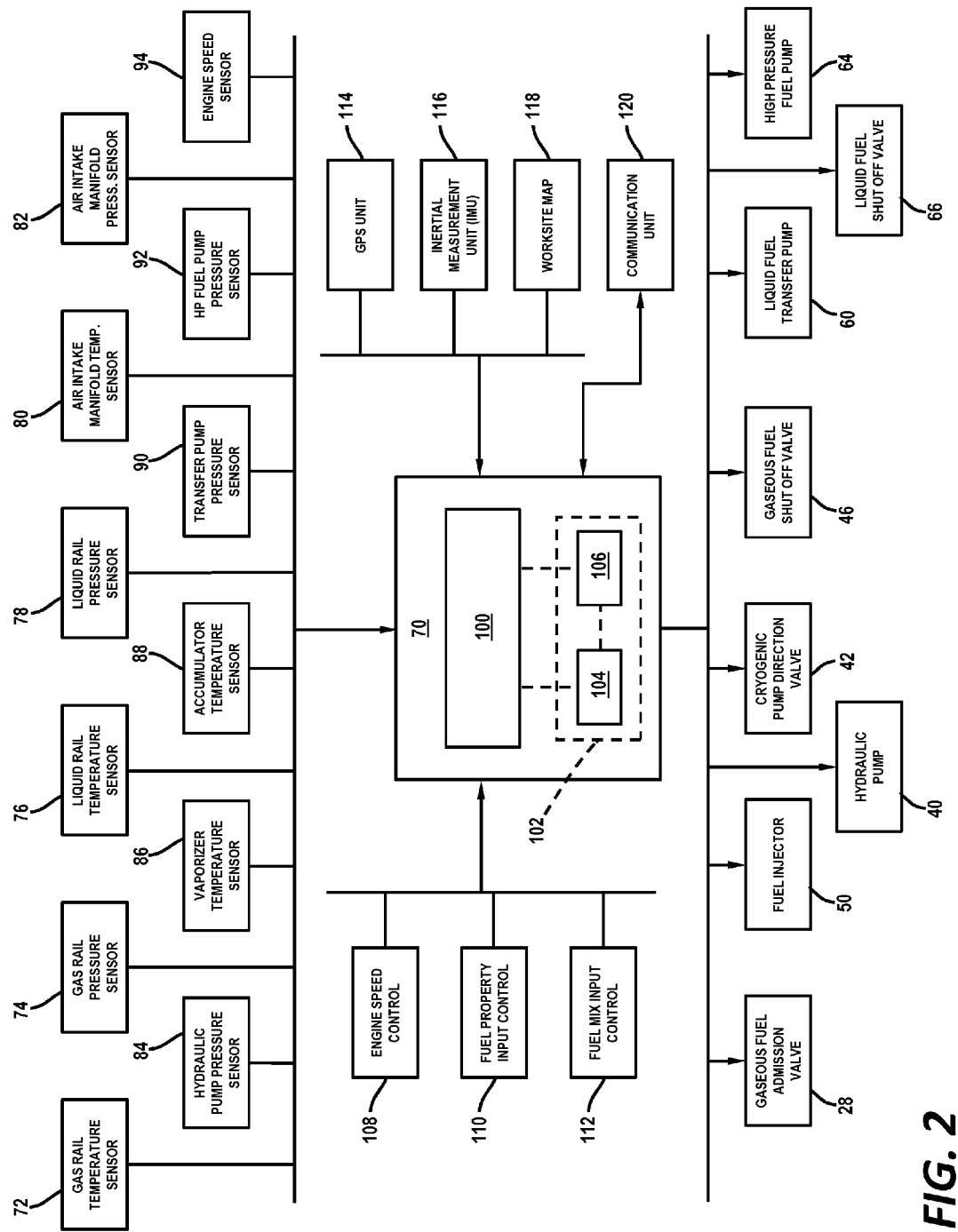
FIG. 2 is a schematic illustration of an exemplary electronic control unit and control components that may be implemented in the exemplary multi fuel engine system of FIG. 1.

FIG. 2 illustrates one exemplary configuration of the ECM 70 that may be implemented in the multi fuel engine system 10 to control the operation of the engine 12 and the apportionment of fuels to provide the required power to the engine 12, and, if desired, to control the operations of other systems that are integrated with the multi fuel engine system 10. The ECM 70 may include a microprocessor 100 for executing specified programs that control and monitor various functions associated with the system 10. The microprocessor 100 includes a memory 102, such as read only memory (ROM) 104, for storing a program or programs, and a random access memory (RAM) 106 which serves as a working memory area for use in executing the program(s) stored in the memory 102. Although the microprocessor 100 is shown, it is also possible and contemplated to use other electronic components such as a microcontroller, an ASIC (application specific integrated circuit) chip, or any other integrated circuit device.

The ECM 70 electrically connects to the control elements of the multi fuel engine system 10, as well as various input devices for commanding the operation of the engine 12 and monitoring its performance. As a result, the ECM 70 may be electrically connected to the temperature sensors 72, 76, 80, 86, 88, the pressure sensors 74, 78, 82, 84, 90, 92 and the engine speed sensor 94 as discussed above to receive parameter value indicative signals relating to the operating conditions of the system 10. The ECM 70 may also be electrically connected to input devices such as, for example, an engine speed control 108, a fuel property input control 110 and a fuel mix input control 112. An operator of the multi fuel engine system 10 may manipulate the controls 108, 110, 112 to generate and transmit control signals to the ECM 70 with commands for operating the engine 12 as desired to produce the necessary engine speed with a desired apportionment of the available fuels. The engine speed control 108 may be any type of input device allowing an operator to specify a speed at which the engine 12 should operate to provide the output necessary to perform a desired task. For example, the engine speed control 108 could be a gas pedal of a vehicle or excavating machine, a thrust lever of an airplane, or other appropriate input device for specifying the speed of the engine 12.

The fuel property input control 110 may be any appropriate input device allowing an operator, technician or other user of the multi fuel engine system 10 to input information regarding the properties of the fuels available for use by the system 10. The fuel property data input may include any data necessary for the system 10 to determine an amount of a fuel necessary for producing an amount of power in the engine 12 to produce the speed commanded by the engine speed control 108. Examples of fuel property data that may be specified for a fuel available to the engine 12 include the density or specific gravity of the fuel, the heat of combustion of the fuel expressed as, for example, a lower or higher heating value indicating the energy released by the fuel per unit of mass or volume, and the like. The fuel property input control 110 may be a computer terminal or other similar input device connected to the ECM 70 and allowing a user to input the fuel property data and transmit the data to the ECM 70. In alternative embodiments, the fuel property input control 110 may be a remote computing device or computing system connected via a network to transmit fuel property data to the multi fuel engine system 10 from a remote location, such as a central control center, managing the operation of the system 10 in conjunction with the ECM 70. As a further alternative, the fuel property input control 110 may be an external storage device, such as a magnetic, optical or solid state storage device, on which the fuel property data is stored and downloaded to the ECM 70 when the external storage device is connected thereto. Further alternative devices for inputting fuel property data and transferring the data to the ECM 70, which can be a direct connection or a wireless connection, will be apparent to those skilled in the art and are contemplated by the inventors as having use in multi fuel engine systems in accordance with the present disclosure.

The fuel mix input control 112 may be any appropriate input device allowing an operator, technician or other user of the multi fuel engine system 10 to input information regarding the apportionment of the fuels available for use by the system 10. The fuel mix data input at the fuel mix input control 112 may specify fuel substitution ratios or fractions for usage of each of the available fuels for meeting the desired engine speed input power necessary to operate the engine 12 at the engine speed specified at the engine speed control 108. For example, in a dual fuel engine operating with a gaseous fuel (e.g., natural gas) and a liquid fuel (e.g., diesel fuel), it may be desired in a multi fuel mode to have the gaseous fuel provide 80% of the power requirement and have the liquid fuel provide the remaining 20% of the power requirement. In such a case, a substitution ratio of 20%, or 0.20, may be input at the fuel mix input control 112 and stored at the ECM 70 so that the liquid fuel will be substituted for the gaseous fuel and provide 20% of the power. Where more fuels are available, a fuel substitution ratio or fraction may be input for each fuel, with the individual substitution ratios totaling 100%, or 1.00, so that the power supplied by the individual fuels adds up to the total input power required for the engine 12. The fuel mix input control 112 may be a similar input device as those discussed above for the fuel property input control 110. In some embodiments, the input controls 110, 112 may be implemented in the same input device, such as a graphical user interface located within an operator station and having a series of screens allowing an operator to input the fuel property data and the fuel mix data.

In the engine system in accordance with the present disclosure, additional components are provided to further assist the ECM 70 in controlling the engine system 10 and in identifying opportunities for converting and storing energy from the engine 12 for later use when high load demands are placed on the engine 12. During operation of the machine in which the engine system 10 is implemented, the engine 12 experiences periods of heavy loading, such as when hauling a load, driving uphill and operating an implement to perform work. The engine 12 also experiences periods of minimal loading, or having its shaft turned by other drive elements, such as when coasting or braking, or when traveling downhill. These latter periods provide an opportunity to accumulate and store energy for later use, particularly within the gaseous fuel supply system 32, when the low or no load periods can be identified by the ECM 70. For this purpose, the system 10 may include a global positioning system (GPS) unit 114 operatively connected to the ECM 70 to provide signals indicating the position of the machine when the machine is in an open work area. Depending on the speed of the machine, the GPS unit 114 may also derive the direction and speed of movement of the machine with reasonable accuracy and communicate the information to the ECM 70.

As an alternative or as a supplement to the GPS unit 114, the system 10 may be provided with an inertial measurement unit (IMU) 116 operatively connected to the ECM 70 and transmitting signals to the ECM 70 indicating the velocity, orientation and gravitational forces acting on the machine, as well as a location of the machine determined by dead reckoning. The IMU 116 allows the position of the machine to be determined when GPS signals are unavailable, such as in mines, tunnels, buildings or other enclosed work spaces. In other environments, the information from the GPS unit 114 and the IMU 116 may be used together to give a complete indication of the position and travel of the machine. The information from the IMU 116 can be used to determine whether the machine is moving uphill and placing a greater load on the engine 12, or moving downhill with a lesser load on the engine 12, among other characteristics of the machine's movement.

As a further supplement, the system 10 may include a work site map 118 either as a separate module operatively connected to the ECM 70, or as a file loaded into and stored in the memory 102. Alternatively, the work site map 118 may be stored at a remote location, such as a control room, and access by the ECM 70 as necessary via a communication unit 120 of the engine system 10 to retrieve the work site map. The work site map 118 includes the geographic layout of the work site including routes through the work site between various workstations over which the machine may travel. The work site map 118 may further include supplemental information such as topographical information indicative of the grade of the terrain, speed limits along the work routes and other information that can be used in calculating a total payload for the machine and a load being applied to the engine 12. In other embodiments, the engine system 10 may have a truck operation schedule or truck assignments for the machine that can be used by the ECM 70 to determine fuel requirements for the machine and plan for accumulation of energy in advance of the time for discharging the energy during haul routes. The truck operation schedule and assignments may be provided in the work site map 118, in a separate unit operatively connected to the ECM 70, or as a file stored in the memory 102.

The ECM 70 may also be electrically connect to actuators and transmit control signals to the actuators to cause the various elements of the multi fuel engine system 10 to operate. Consequently, actuators for fluid flow control devices such as the valves 28, 44, 46, 66, the liquid fuel injector 50 and the pumps 40, 60, 64 may be connected to the ECM 70 and receive control signals from the ECM 70 to operate the corresponding valves 28, 44, 46, 66, the fuel injector 50 and the pumps 40, 60, 64 to control flow of the gaseous and liquid fuels. Alternate implementations of the system 10 may allow the engine 12 to be powered by additional fuels that may be available. In those implementations, additional control valves and shut off valves may be provided to control the flow of the additional fuels used in the system 10.

INDUSTRIAL APPLICABILITY

The ECM 70 and the accompanying control elements of FIG. 2 may be used to implement an energy accumulation and discharge strategy for the multi fuel engine system 10. In such a strategy, the system 10 may store energy that may be drawn during the operation of the machine in an appropriate accumulation device, such as the CNG accumulator 48 of FIG. 1, and subsequently discharge the accumulated energy instead of drawing power from the engine 12 and correspondingly increasing the fuel required to power the engine 12. In the example of FIG. 1, the CNG accumulator 48 may be enlarged to increase the volume of CNG that may be stored therein, or multiple CNG accumulators 48 may be provided, to allow accumulation of CNG during the low and no load periods discussed above. For example, when the machine is coasting downhill and a reduced amount of or know fuel is required, the hydraulic pump 40 may be engaged to the output shaft of the engine 12 to power the gaseous fuel pump 36 and provide CNG from the gaseous fuel supply system 32. When the common rail 30 is full or the gas shut off valve 46 is closed, energy in the form of the additional CNG is stored in the CNG accumulator or accumulators 48. The supply system 32 may continue to produce CNG and tell either the CNG accumulator 48 is fully charged or the machine is no longer operating in the low or no load conditions, at which time the hydraulic pump 40 may be disengaged.

With the CNG accumulator 48 fully or partially charged with CNG, the CNG may be discharged, and the stored energy may be used as a substitute for engaging the hydraulic pump 40 and draining power from the engine 12, when the supply system 32 is called upon to provide CNG for the combustion cycle. With the gas shut off valve 46 open and CNG being drawn from the common rail 30 by the gaseous fuel admission valve 28, the common rail 30 is replenished with CNG from the accumulator 48. The replenishment may continue until the signal from the accumulator temperature sensor 88 indicates that the amount of CNG in the accumulator 48 is below a specified minimum charge level. Alternatively, a pressure sensor or other appropriate sensing device may be provided as a substitute for or in addition to the accumulator temperature sensor 88 if necessary to determine the amount of CNG in the accumulator 48. At that point, the hydraulic pump 40 may be engaged to produce and output CNG from the supply system 32 in a normal operating mode if CNG is still required for the combustion cycle. By charging the accumulator 48 at a time when little or no fuel is required, and discharging the stored energy instead of drawing power from the engine 12 for at least a portion of the time when CNG is needed, fuel savings is realized in the efficiency of the engine system 10 is improved.

Figure 3:
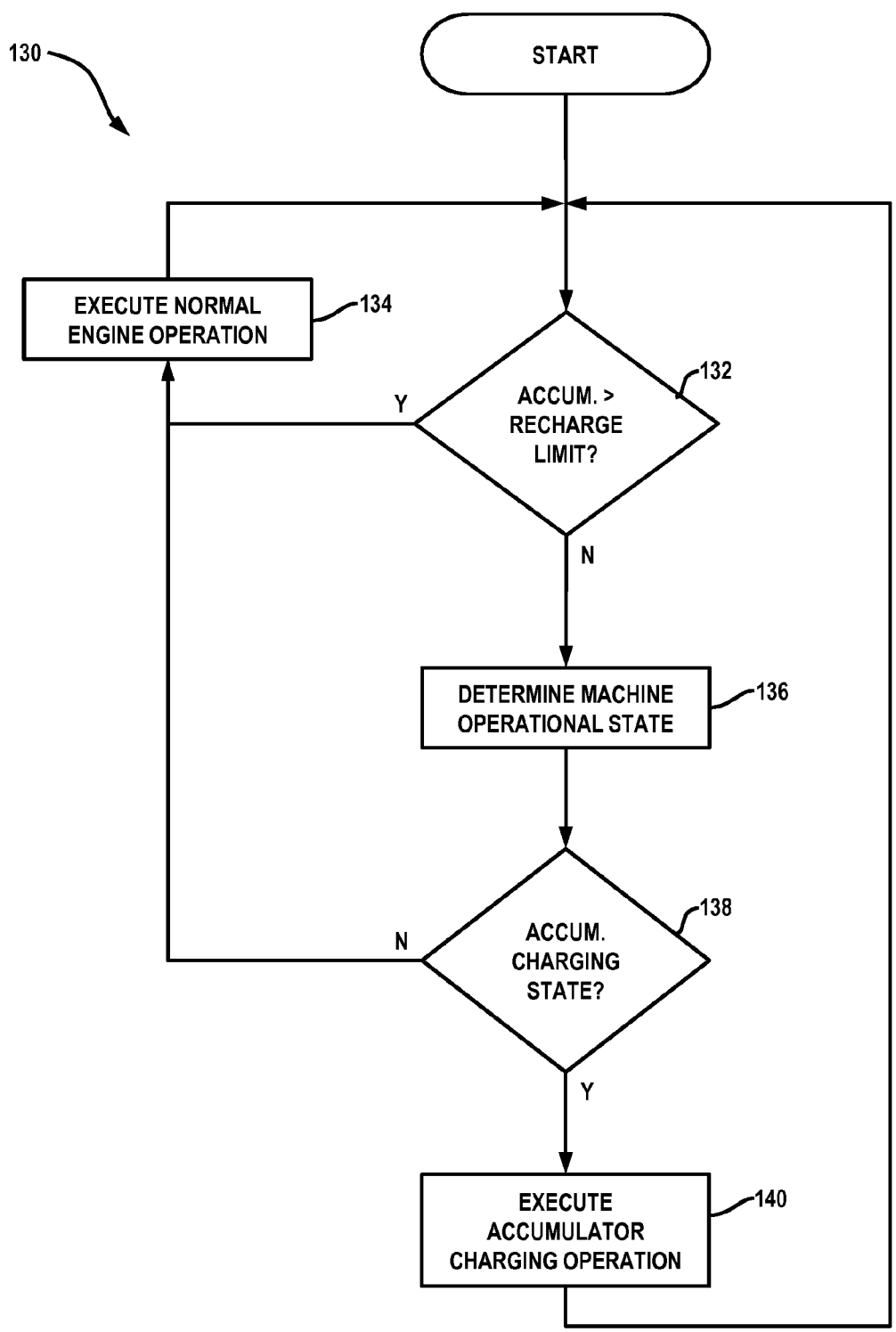
FIG. 3 is a flowchart of an exemplary accumulator charging control routine that may be implemented in the multi fuel engine system of FIG. 1.

FIG. 3 illustrates one example of an accumulator charging routine 130 that may be implemented in the multi fuel engine system 10. The accumulator charging routine 130 may be implemented as software stored in the memory 102 and executed by the microprocessor 100 in a stand-alone manner at the machine as discussed herein. Alternatively, functionality illustrated and described herein may be distributed in any appropriate manner between the ECM 70 and computers at processing devices at remote control centers via communications performed by the communication unit 120. Other distributions of the functionality between the ECM 70 and other remote processing units will be apparent to those skilled in the art and are contemplated by the inventors. The accumulator charging routine 130 may begin at a block 132 where the ECM 70 determines whether the power accumulator device is charged to a level greater than a predetermined recharge limit. In the above example, the power accumulator device is the accumulator 48 or a plurality of accumulators 48. However, power may be accumulated and stored in alternative accumulation mechanism such as those described further hereinafter. In the case of the accumulator 48, the ECM 70 may evaluate the signals received from the gas rail pressure sensor 74 and the accumulator temperature sensor 88 with the gas shut off valve 46 open to determine the amount of CNG stored in the accumulator 48 using standard gas equations.

If the signals from the accumulator temperature sensor 88 indicate that the accumulator 48 is charged above the recharge limit, no additional charging is necessary, and may not be possible. In this case, control may pass to a block 134 where the ECM 70 controls the engine system 10 to perform normal engine operations. Under normal operations, the ECM 70 executes a fuel substitution strategy stored therein where the fuel supply systems 32, 54 are caused to provide CNG and diesel fuel, respectively, and specified substitution ratios. Because the accumulator 48 is fully charged, the normal engine operations may include accessing the stored CNG according to an accumulator discharge routine as discussed further below. As the normal engine operations are executing, control returns to the block 132 to continue monitoring for the accumulator 48 to be charged to less than the recharge limit.

If the ECM 70 determines that the charge in the accumulator 48 is less than the recharge limit based on the CNG temperature signals from the temperature sensor 88, additional CNG may be produced and stored in the accumulator 48. In this case, control may pass to a block 136 where the ECM 70 determines a current machine operational state. The ECM 70 may use the available information to determine whether the machine is currently operating in a state that will allow the accumulator 48 to be charged. Such a determination may assess many different factors. For example, the ECM 70 may use the available information from the GPS unit 114, the IMU 116, and the work site map 118 to determine the location of the machine within the worksite, the direction and speed at which the machine is traveling, and the orientation of the machine and grade of the surface over which the machine is traveling. Conditions are likely not favorable for charging the accumulator 48 where the machine is traveling uphill or possibly on level ground, or where the machine will soon arrive at an uphill grade or at a location where the speed limit will increase and thereby increase the load on the engine 12 to increase the speed of the machine. It may also not be favorable where the machine is stopped and idling, or where the engine 12 is providing power to operate an implement. The ECM 70 may also evaluate the control signals from the engine speed sensor 94 and the engine speed control 108 to compare the actual engine speed to the commanded engine speed. It may not be desired to attempt to charge the accumulator 48 where the actual engine speed is less than the commanded engine speed and additional fuel is required to increase the engine speed. In contrast, the machine may be in a state that is favorable for charging the accumulator 48 where the control signals and other data indicate that the machine is traveling downhill or coasting, will not imminently change to an uphill grade or increase speed, and the actual engine speed is greater than the commanded engine speed. The actual criteria for determining whether the machine is operating in an accumulator charging state will vary based on the machine in which the engine system 10 is implemented, the worksite environment within which the machine will operate, and other factors. Configuration of the engine system 10 for a particular implementation is within the capabilities of those skilled in the art and is contemplated by the inventors.

Once the current operational state of the machine is determined at the block 136, control may pass to a block 138 of which the current operational state is compared to an actuator charging state. If the machine is not in the accumulator charging state, control may pass to the block 134 to execute normal engine operations. If the machine is operating within an accumulator charging state at the block 138, control may pass to a block 140 where the ECM 70 causes the engine system 10 to execute an accumulator charging operation. In the present example, the ECM 70 may transmit control signals to operatively couple the hydraulic pump 40 to the output shaft of the engine 12 to generate flow of CNG in the supply system 32. At the same time, the ECM 70 may transmit control signals to the admission valve 28 and/or the gas shut off valve 46, if necessary, to ensure that the CNG diverts into the accumulator 48. With the charging operation initiated, control may pass back to the block 132 to determine when the accumulator 48 is charged above the recharge limit. The ECM 70 will continue executing the accumulator charging operation until either the accumulator 48 is fully charged with CNG or the engine 12 operates outside the accumulator charging state.

Figure 4:
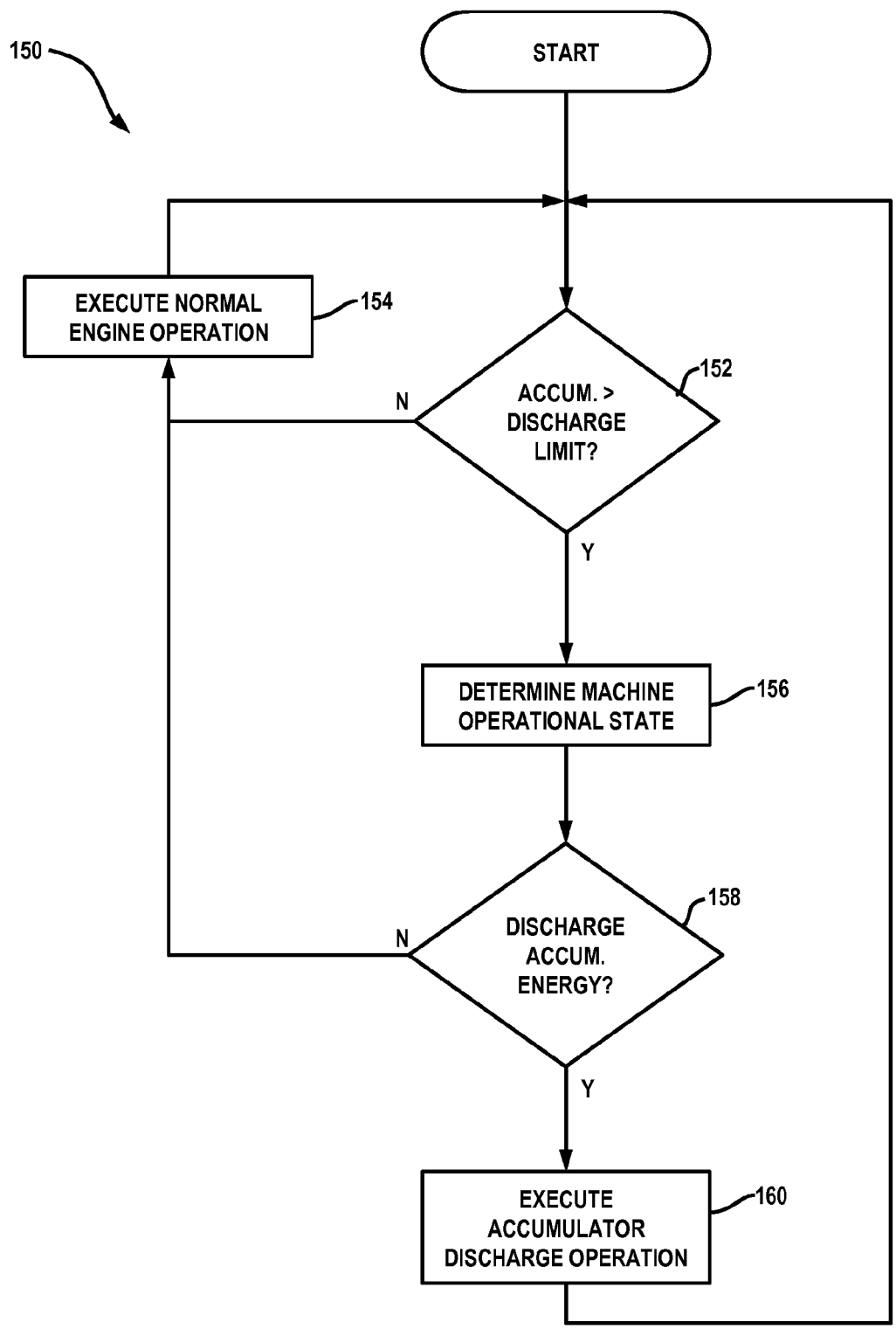
FIG. 4 is a flowchart of an exemplary accumulator discharge control routine that may be implemented in the multi fuel engine system of FIG. 1

With the accumulator 48 fully or partially charged with CNG and the corresponding stored energy, the machine may discharge and utilize the stored energy under appropriate operating conditions. FIG. 4 illustrates an exemplary accumulator discharge routine 150 that may be executed by the ECM 70 determine when to discharge the stored CNG from the accumulator 48 in lieu of engaging the supply system 32. The discharge routine 150 may begin at a block 152 where the ECM 70 determines whether the accumulator 48 is charged with at least an amount of CNG that is greater than a predetermined discharge limit. Similar to the block 132, the ECM 70 may evaluate the signals from the accumulator temperature sensor 88 to determine the amount of CNG in the accumulator 48. If an amount less than the predetermined minimum discharge limit amount of CNG is in the accumulator 48, control passes to a block 154 where the ECM 70 controls the engine system 10 to execute normal engine operations as described above. Control then returns to the block 152, and normal engine operations will continue until the accumulator charging routine 130 executes to charge the accumulator 48 to at least the required minimum discharge limit amount of CNG.

If the accumulator 48 is charged with at least the minimum discharge limit amount of CNG at the block 152, control may pass to a block 156 wherein the ECM 70 determines the operational state of the machine with respect to the need for the supply system 32 to supply CNG for the combustion cycle. For example, the ECM 70 may be configured to determine from the fuel mix information from the input control 112 and the programmed fuel substitution strategy whether the machine is operating in a liquid fuel only mode where CNG is not required, or a mixed fuel or gaseous fuel only mode where CNG will be provided by the supply system 32. Once the current operational state of the machine is determined at the block 156, control may pass to a block 158 to determine whether to discharge the CNG and energy stored at the accumulator 48. Where the ECM 70 determines that the engine system 10 is in a liquid fuel only mode or other mode that does not require CNG, control may pass to the block 154 to execute the normal engine operations.

If the ECM 70 determines that the engine system 10 is in a mixed fuel or gaseous fuel only mode, or other operational state requiring CNG from the supply system 32 at the block 158, control may pass to a block 160 wherein the ECM 70 may cause the engine system 10 to execute an accumulator discharge operation. With the accumulator 48 fully or partially charged, the supply system 32 is not required to produce additional CNG. When CNG is required for the common rail 30 and the admission valve 28, the ECM 70 may transmit control signals to the gas shut off valve 46 to operate and release the stored CNG without also sending control signals to actuate the hydraulic pump 40. With the discharge process initiated, control may pass back to the block 152 to determine when the CNG level in the accumulator 48 falls below the minimum discharge limit amount. The ECM 70 will continue execution of the accumulator discharge operation until either the CNG is discharged from the accumulator 48 or the engine 12 operates outside the discharging operational state.

Figure 5:
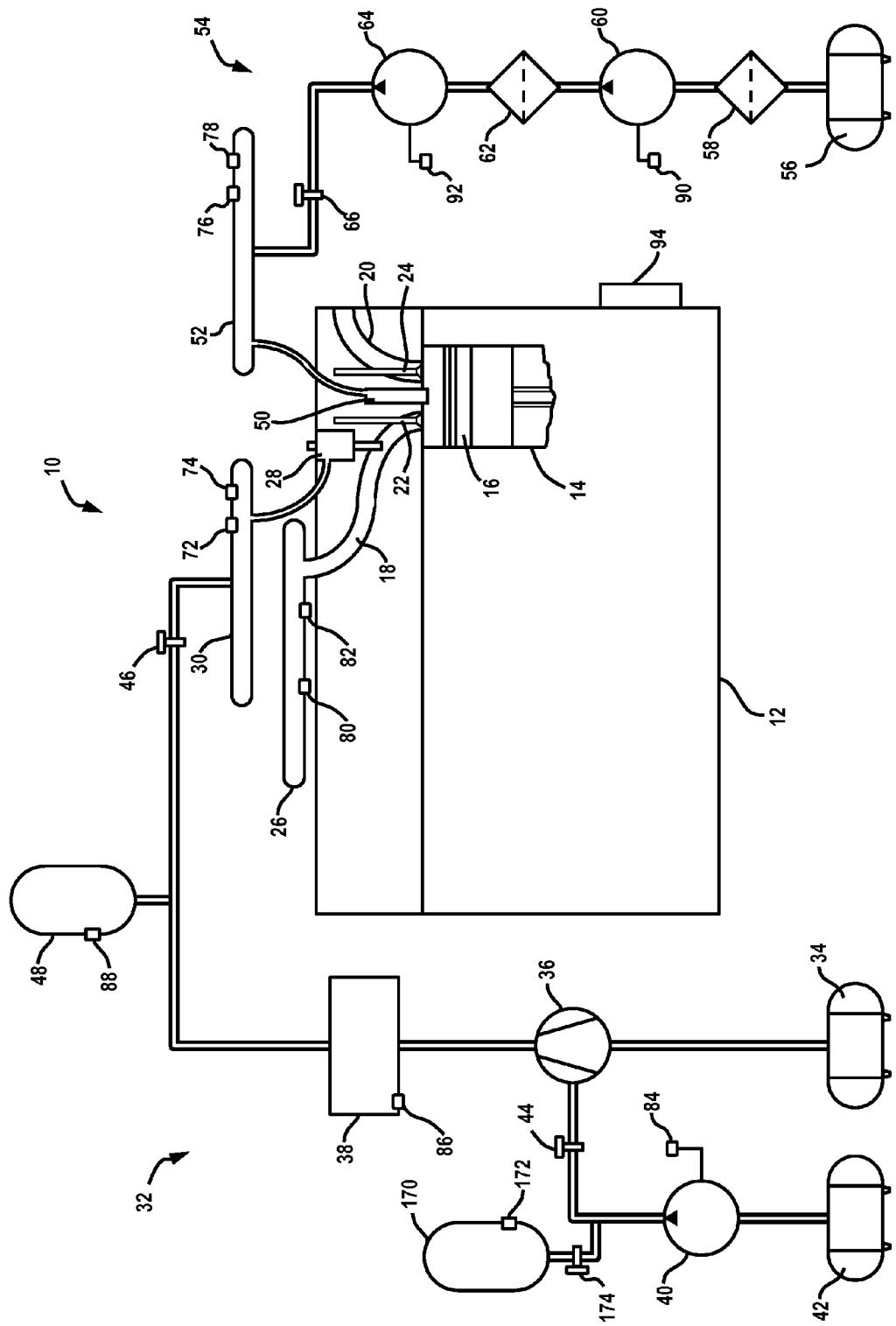
FIG. 5 is a schematic view of an alternative embodiment of a multi fuel engine system in accordance with the present disclosure having a pressurized hydraulic fluid accumulator.

Those skilled in the art will understand that the gaseous fuel supply system 32 configured to accumulate and store CNG in the accumulator 48 as a mechanism for increasing the efficiency of the engine system 10 is illustrated and described above is exemplary, and alternative mechanisms may be implemented in the engine system 10 to realize similar increased efficiencies. For example, FIG. 5 illustrates an alternative embodiment of the engine system 10 wherein a hydraulic fluid accumulator 170 is installed between the hydraulic pump 40 and the gaseous fuel pump 36, and upstream of the hydraulic fluid cut off valve 44. A corresponding sensor 172 for the accumulator 170 may be operatively connected to the ECM 70 and transmit signals of temperature and/or pressure as necessary for the ECM 70 to determine a volume of hydraulic fluid contained within the accumulator 170. A solenoid operated cut off valve 174 may be provided between the hydraulic pump 40 and the hydraulic fluid accumulator 170 and be operatively connected to the ECM 70 to prevent unintended backflow through the hydraulic pump 40, or to allow strategic backflow of pressurized fluid stored in the accumulator 170 through the pump 40 to start or mechanically boost the engine 12.

Execution of the routines 130, 150 may occur in a generally similar manner as described above with the exception of using the sensor 172 for determining whether the accumulator 170 is fully or partially charged with hydraulic fluid at the blocks 132, 152, and controlling the hydraulic fluid cut off valve 44 alternately to allow the hydraulic fluid to power the gaseous fuel pump 36 and to divert the hydraulic fluid to the accumulator 170. Consequently, when the accumulator charging operation is performed at the block 140, the ECM 70 may transmit control signals causing the hydraulic fluid cut off valve 44 to close and divert hydraulic fluid to the accumulator 170. When the accumulator discharging operation is performed at the block 160, the ECM 70 may transmit control signals causing the hydraulic fluid cut off valve 44 to open and provide hydraulic fluid from the accumulator 170 to the gaseous fuel pump 36 without engaging the hydraulic pump 40.

Figure 6:
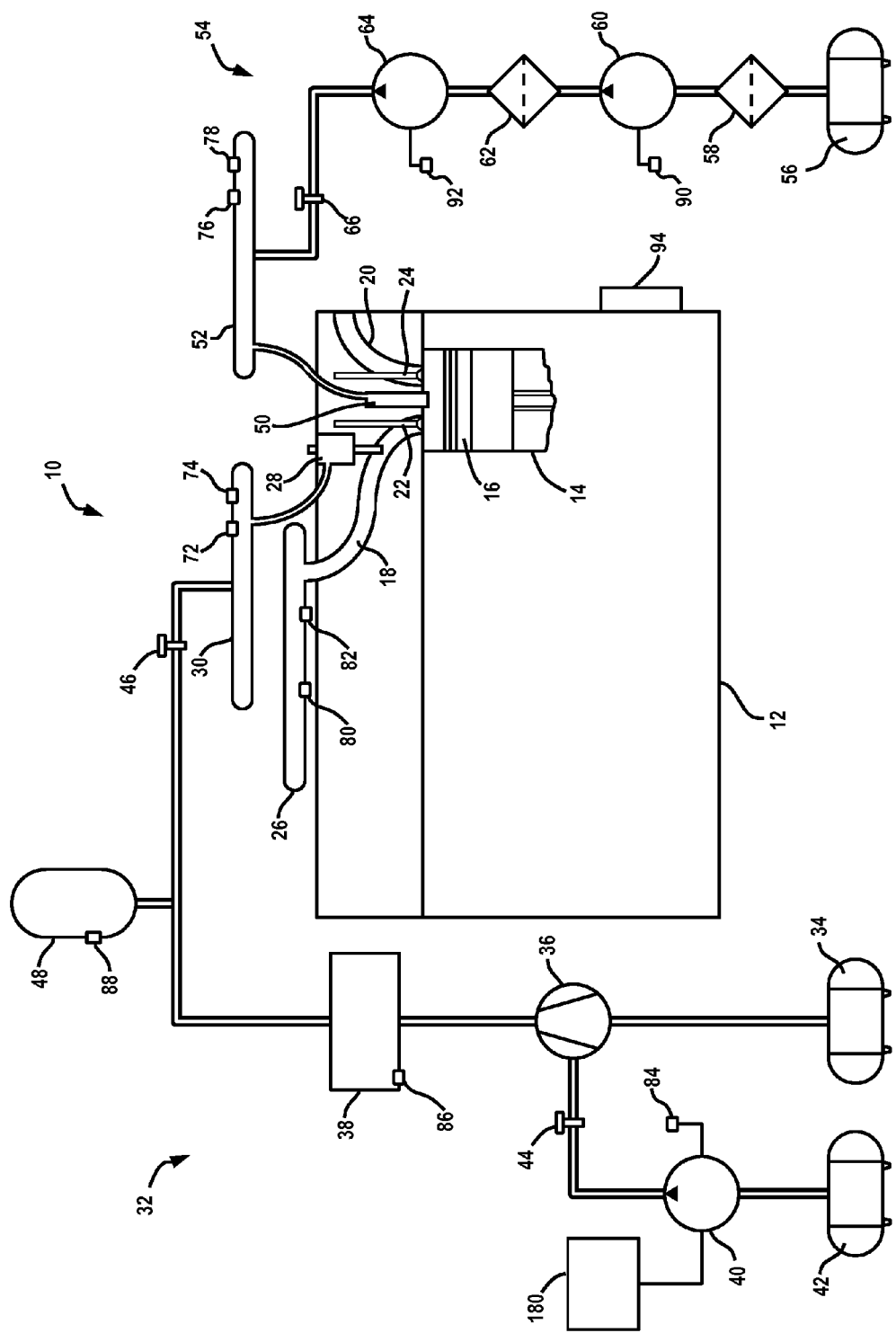
FIG. 6 is a schematic view of a further embodiment of a multi fuel engine system in accordance with the present disclosure having a hydraulic pump powered by a battery pack.

In another alternative embodiment illustrated in FIG. 6, the hydraulic pump 40 may be an electric pump powered by a battery pack 180 that may be selectively operatively coupled to the output shaft of the engine 12 to recharge the battery pack 180 serving as the power accumulator for the supply system 32. The battery pack 180 may be operatively connected to the ECM 70 such that the ECM 70 may determine the charge level of the battery pack 180 at blocks 132, 152 of the routines 130, 150, respectively. When the accumulator charging operation is executed at the block 140, the battery pack 180 may be operatively coupled to the output shaft of the engine 12 to charge the battery pack 180. Subsequently, when the battery pack 180 is charged and the accumulator discharge operation is executed at the block 160, the power from the battery pack 180 drives the hydraulic pump 40 without the battery pack 180 being operatively coupled to and increasing the load on the engine 12. In further alternative embodiments, similar energy accumulator mechanisms may be implemented in the liquid fuel supply system 54 for storing liquid fuel downstream of the transfer pump 60 and/or HP fuel pump 64, overpowering one or both of the pumps 60, 64 with rechargeable battery packs. As a further alternative to the storage of hydraulic or electric power, mechanical storage mechanisms may be implemented in the engine system 10, such as in a flywheel or spring that may be alternately coupled to the pumps 40 and/or the output shaft of the engine 12 to be charged with and to discharge power in accordance with the routines 130, 150.

With any of the accumulator mechanisms discussed here as well as other mechanisms that may be implemented, consideration must be given in designing the engine system 10 to the number and size of accumulator mechanisms that will be used. While implementing the charging and discharging routines 130, 150 conceptually increases the efficiency of the engine system 10, increasing the size and/or number of CNG accumulators 48, for example, increases the weight of the machine and fuel required to move the machine of a given speed. Adding too much weight to the machine via the accumulator mechanisms will eventually cannibalize the fuel savings achieved through the routines 130, 150. Consequently, such considerations must be taken into account in each implementation to maximize the benefits provided by the systems and methods disclosed herein.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. An engine system for a machine, comprising:
   an engine;
   a fuel supply system, comprising:
      a fuel reservoir in fluid communication with the engine, and
      a pump operatively connected to the fuel reservoir to produce flow of fuel from the fuel reservoir to the engine;
   an energy accumulator operatively connected to the fuel supply system, wherein the energy accumulator has capacity to store energy and is configured to discharge the energy to produce a fuel flow in the fuel supply system; and
   an electronic control module operatively connected to the engine, the fuel supply system and the energy accumulator, wherein:
      the electronic control module is configured to determine whether the energy accumulator is charged with a charged energy amount that is greater than a recharge limit amount,
      the electronic control module is configured to determine a machine operational state for the machine in response to determining that the charged energy amount is less than the recharge limit amount, and
      the electronic control module is configured to execute an energy accumulator charging operation to increase the charged energy amount in the energy accumulator in response to determining that the machine operational state is equal to an energy accumulator charging state.

2. The engine system for the machine of claim 1, wherein the electronic control module is configured to execute a normal engine operational state wherein the pump operates to generate the fuel flow to the engine in response to determining that the charged energy amount is greater than the recharge limit amount.

3. The engine system for the machine of claim 1, wherein the electronic control module is configured to execute a normal engine operational state wherein the pump operates to generate the fuel flow to the engine in response to determining that the machine operational state is not equal to the energy accumulator charging state.

4. The engine system for the machine of claim 1, wherein the fuel is a gaseous fuel, the energy accumulator comprises a gaseous fuel accumulator disposed in a fuel flow path between the pump and the engine and the charged energy amount is an accumulated fuel amount in the gaseous fuel accumulator, and wherein the energy accumulator charging operation comprises operating the pump to generate fuel from the fuel reservoir and receiving the gaseous fuel into the gaseous fuel accumulator until one of the accumulated fuel amount in the gaseous fuel accumulator is greater than the recharge limit amount and the machine operational state is not equal to the energy accumulator charging state.

5. The engine system for the machine of claim 1, wherein the energy accumulator comprises a battery pack operatively connected to the pump and the charged energy amount is a battery charge amount in the battery pack, and wherein the energy accumulator charging operation comprises operatively connecting the battery pack to an output shaft of the engine to generate and store electrical energy in the battery pack until one of the battery charge amount in the battery pack is greater than the recharge limit amount and the machine operational state is not equal to the energy accumulator charging state.

6. The engine system for the machine of claim 1, wherein:
   the electronic control module is configured to determine whether the charged energy amount in the energy accumulator is greater than a discharge limit amount;
   the electronic control module is configured to determine the machine operational state for the machine in response to determining that the charged energy amount is greater than the discharge limit amount; and
   the electronic control module is configured to execute an energy accumulator discharging operation to discharge the charged energy amount stored in the energy accumulator to generate the fuel flow to the engine in response to determining that the machine operational state is equal to an energy accumulator discharging state.

7. The engine system for the machine of claim 6, wherein the electronic control module is configured to execute a normal engine operational state wherein the pump operates to generate the fuel flow to the engine in response to determining that the charged energy amount is less than the discharge limit amount.

8. The engine system for the machine of claim 6, wherein the electronic control module is configured to execute a normal engine operational state wherein the pump operates to generate the fuel flow to the engine in response to determining that the machine operational state is not equal to the energy accumulator discharging state.

9. The engine system for the machine of claim 6, wherein the energy accumulator comprises a gaseous fuel accumulator and the charged energy amount is an accumulated fuel amount in the gaseous fuel accumulator, and wherein the energy accumulator discharging operation comprises discharging gaseous fuel stored in the gaseous fuel accumulator to the engine until one of the accumulated fuel amount in the gaseous fuel accumulator is less than the discharge limit amount and the machine operational state is not equal to the energy accumulator discharging state.

10. The engine system for the machine of claim 6, wherein the energy accumulator comprises a battery pack operatively connected to the pump and the charged energy amount is a battery charge amount in the battery pack, and wherein the energy accumulator discharging operation comprises discharging stored electrical energy from the battery pack to operate the pump to create the fuel flow to the engine until one of the battery charge amount in the battery pack is less than the discharge limit amount and the machine operational state is not equal to the energy accumulator discharging state.

11. A method for controlling energy storage for a multi fuel engine of an engine system of a machine, comprising:
    determining whether an energy accumulator of the engine system is charged with a charged energy amount that is greater than a recharge limit amount;
    determining a machine operational state for the machine in response to determining that the charged energy amount is less than the recharge limit amount; and
    executing an energy accumulator charging operation in response to determining that the machine operational state is equal to an energy accumulator charging state.

12. The method for controlling energy storage of claim 11, comprising executing a normal engine operational state in response to determining that the charged energy amount is greater than the recharge limit amount.

13. The method for controlling energy storage of claim 11, comprising executing a normal engine operational state in response to determining that the machine operational state is not equal to the energy accumulator charging state.

14. The method for controlling energy storage of claim 11, wherein the energy accumulator comprises a gaseous fuel accumulator and the charged energy amount is an accumulated fuel amount in the gaseous fuel accumulator, and executing the energy accumulator charging operation comprises discharging gaseous fuel from a gaseous fuel reservoir and into the gaseous fuel accumulator until one of the accumulated fuel amount in the gaseous fuel accumulator is greater than the recharge limit amount and the machine operational state is not equal to the energy accumulator charging state.

15. The method for controlling energy storage of claim 11, wherein the energy accumulator comprises a battery pack operatively connected to a pump that creates fuel flow from a gaseous fuel reservoir to the multi fuel engine and the charged energy amount is a battery charge amount in the battery pack, and executing the energy accumulator charging operation comprises operatively connecting the battery pack to an output shaft of the multi fuel engine to generate and store electrical energy in the battery pack until one of the battery charge amount in the battery pack is greater than the recharge limit amount and the machine operational state is not equal to the energy accumulator charging state.

16. The method for controlling energy storage of claim 11, comprising:
    determining whether the charged energy amount in the energy accumulator is greater than a discharge limit amount;
    determining the machine operational state for the machine in response to determining that the charged energy amount is greater than the discharge limit amount; and
    executing an energy accumulator discharging operation in response to determining that the machine operational state is equal to an energy accumulator discharging state.

17. The method for controlling energy storage of claim 16, comprising executing a normal engine operational state in response to determining that the charged energy amount is less than the discharge limit amount.

18. The method for controlling energy storage of claim 16, comprising executing a normal engine operational state in response to determining that the machine operational state is not equal to the energy accumulator discharging state.

19. The method for controlling energy storage of claim 16, wherein the energy accumulator comprises a gaseous fuel accumulator and the charged energy amount is an accumulated fuel amount in the gaseous fuel accumulator, and executing the energy accumulator discharging operation comprises discharging gaseous fuel stored in the gaseous fuel accumulator to the multi fuel engine until one of the accumulated fuel amount in the gaseous fuel accumulator is less than the discharge limit amount and the machine operational state is not equal to the energy accumulator discharging state.

20. The method for controlling energy storage of claim 16, wherein the energy accumulator comprises a battery pack operatively connected to a pump that creates fuel flow from a gaseous fuel reservoir to the multi fuel engine and the charged energy amount is a battery charge amount in the battery pack, and executing the energy accumulator discharging operation comprises discharging stored electrical energy from the battery pack to operate the pump until one of the battery charge amount in the battery pack is less than the discharge limit amount and the machine operational state is not equal to the energy accumulator discharging state.

* * * * *